(12) United States Patent
Clarkson

(10) Patent No.: US 12,591,574 B2
(45) Date of Patent: Mar. 31, 2026

(54) QUERY ENGINE FOR GRAPH DATABASES AND HETEROGENEOUS HARDWARE

(71) Applicant: Neo4j Sweden AB, San Mateo, CA (US)

(72) Inventor: James Clarkson, Tewkesbury (GB)

(73) Assignee: Neo4j Sweden AB, San Mateo, CA (US)

( * ) Notice: Subject to any disclaimer, the term of this patent is extended or adjusted under 35 U.S.C. 154(b) by 0 days.

(21) Appl. No.: 18/762,401

(22) Filed: Jul. 2, 2024

(65) Prior Publication Data

US 2025/0013646 A1    Jan. 9, 2025

Related U.S. Application Data

(60) Provisional application No. 63/524,827, filed on Jul. 3, 2023.

(51) Int. Cl.
*G06F 16/2453* (2019.01)

(52) U.S. Cl.
CPC ............................ *G06F 16/24549* (2019.01)

(58) Field of Classification Search
CPC ..................... G06F 16/24549; G06F 16/24568
See application file for complete search history.

(56) References Cited

U.S. PATENT DOCUMENTS

| | | | | | |
|---|---|---|---|---|---|
| 2005/0097078 | A1* | 5/2005 | Lohman | ............ | G06F 16/90335 |
| | | | | | 707/E17.14 |
| 2007/0234325 | A1* | 10/2007 | Bobrovsky | ......... | G06F 9/45516 |
| | | | | | 717/148 |

| | | | | | |
|---|---|---|---|---|---|
| 2008/0306920 | A1* | 12/2008 | Santosuosso | ..... | G06F 16/24561 |
| 2009/0024622 | A1* | 1/2009 | Chkodrov | ......... | G06F 16/24568 |
| 2013/0290641 | A1* | 10/2013 | Corrie | ................... | G06F 12/023 |
| | | | | | 711/E12.07 |
| 2014/0201343 | A1* | 7/2014 | Keskkula | ............ | H04L 63/1408 |
| | | | | | 709/221 |
| 2014/0310259 | A1* | 10/2014 | Tian | .................... | G06F 16/2471 |
| | | | | | 707/718 |
| 2015/0039587 | A1* | 2/2015 | Liu | ..................... | G06F 16/8365 |
| | | | | | 707/718 |
| 2018/0268030 | A1* | 9/2018 | Liu | ..................... | G06F 16/2471 |

(Continued)

FOREIGN PATENT DOCUMENTS

WO        WO-2005101198 A2 * 10/2005    ............... G06F 8/31

OTHER PUBLICATIONS

Wikipedia, Cache (computing) (Year: 2023).*

(Continued)

*Primary Examiner* — William Spieler
(74) *Attorney, Agent, or Firm* — Van Pelt, Yi & James LLP

(57)        ABSTRACT

Database query processing techniques are disclosed. In various embodiments, a query associated with a database is received. A byte code representation of the query is generated, including by decomposing the query into a discrete set of streaming operators defined over associated data frames, wherein the byte code includes code defining for each operator in the discrete set of streaming operators the processing to be performed by that operator and further embodies a data flow graph that defines a flow of data to and through the discrete set of streaming operators. The byte code is executed by a query processing engine to generate and return a query result.

20 Claims, 10 Drawing Sheets

(56) References Cited

U.S. PATENT DOCUMENTS

| | | | | |
|---|---|---|---|---|
| 2021/0334298 | A1* | 10/2021 | Neumann | ........... G06F 16/3332 |
| 2024/0134894 | A1* | 4/2024 | Neumann | ............. G06F 16/334 |
| 2024/0427767 | A1* | 12/2024 | Terlecki | ............ G06F 16/24542 |

OTHER PUBLICATIONS

Wikipedia, Load balancing (computing) (Year: 2023).*
International Search Report in PCT/US 24/36592 (Year: 2024).*
Wikipedia, Pipeline (computing) (Year: 2023).*
Thomas, Writing Hello World in Java byte code (Year: 2017).*

\* cited by examiner

200

Figure 3:
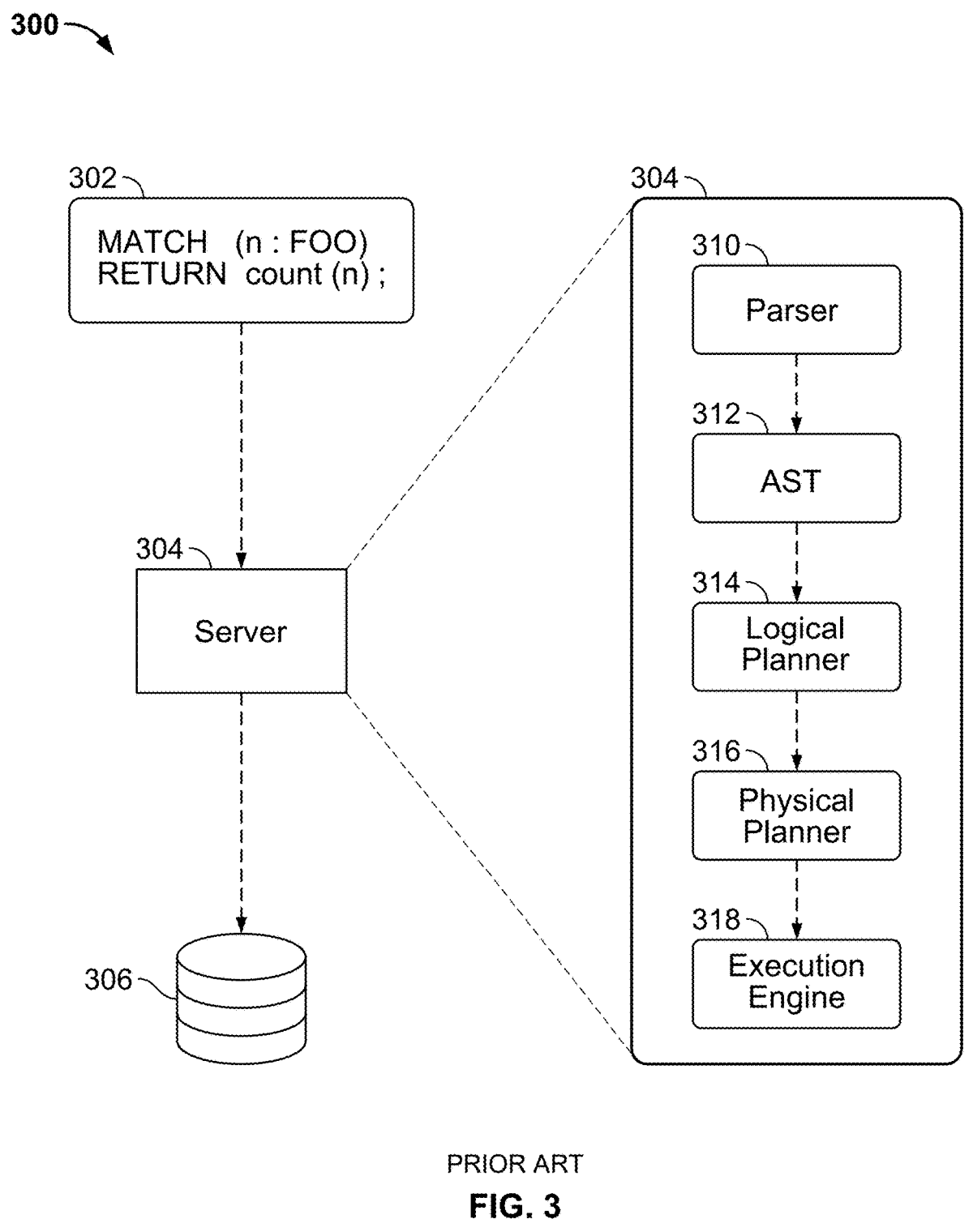

300

302

```
MATCH  (n : FOO)
RETURN  count (n) ;
```

304

Server

306

304

310
Parser

312
AST

314
Logical
Planner

316
Physical
Planner

318
Execution
Engine

PRIOR ART

```
MATCH  (n : FOO)
RETURN  count (n) ;
```

404

Query
Compiler

404

406

Parser

408

IR

410

Bytecode
Emitter

412

Virtual
Machine

412

416  Graph
Metadata

422  Buffer
Manager

420  Scheduler

418  JIT
Compiler

414

500

520

600

800

Machine 1 — 802

806

804

L2

(0) (1)

(2)

(3)

L1

Operator 0 | Rx [ ] [ ]
Tx [ ] [ ] [ ]

Operator 2 Proxy | Rx
Tx

Data Frames
Transfered via gRPC

Machine 2 — 812

816

814

L2

(0) (1)

(2)

(3)

L1

Operator 2 | Rx [ ] [ ]
Tx [ ] [ ] [ ]

Operator 3 | Rx
Tx

QUERY ENGINE FOR GRAPH DATABASES AND HETEROGENEOUS HARDWARE

CROSS REFERENCE TO OTHER APPLICATIONS

This application claims priority to U.S. Provisional Patent Application No. 63/524,827 entitled QUERY ENGINE FOR GRAPH DATABASES AND HETEROGENEOUS HARDWARE filed Jul. 3, 2023, which is incorporated herein by reference for all purposes.

BACKGROUND OF THE INVENTION

Typically, data stored in a database is accessed via a client or web-based application. A user enters a query expressed using a query language, such as Structure Query Language (SQL) or other languages used to access and/or manage relational databases, or Cypher™, Graph Query Language (GQL), or other languages used to access graph databases. Queries expressed using such languages typically are sent to a database management/access server, which parses the query as expressed using the query language and develops and executes a plan to perform the query and return results.

BRIEF DESCRIPTION OF THE DRA WINGS

Various embodiments of the invention are disclosed in the following detailed description and the accompanying drawings.

FIG. 3 is a block diagram illustrating an example of query processing in a prior art database management system.

DETAILED DESCRIPTION

Figure 1:
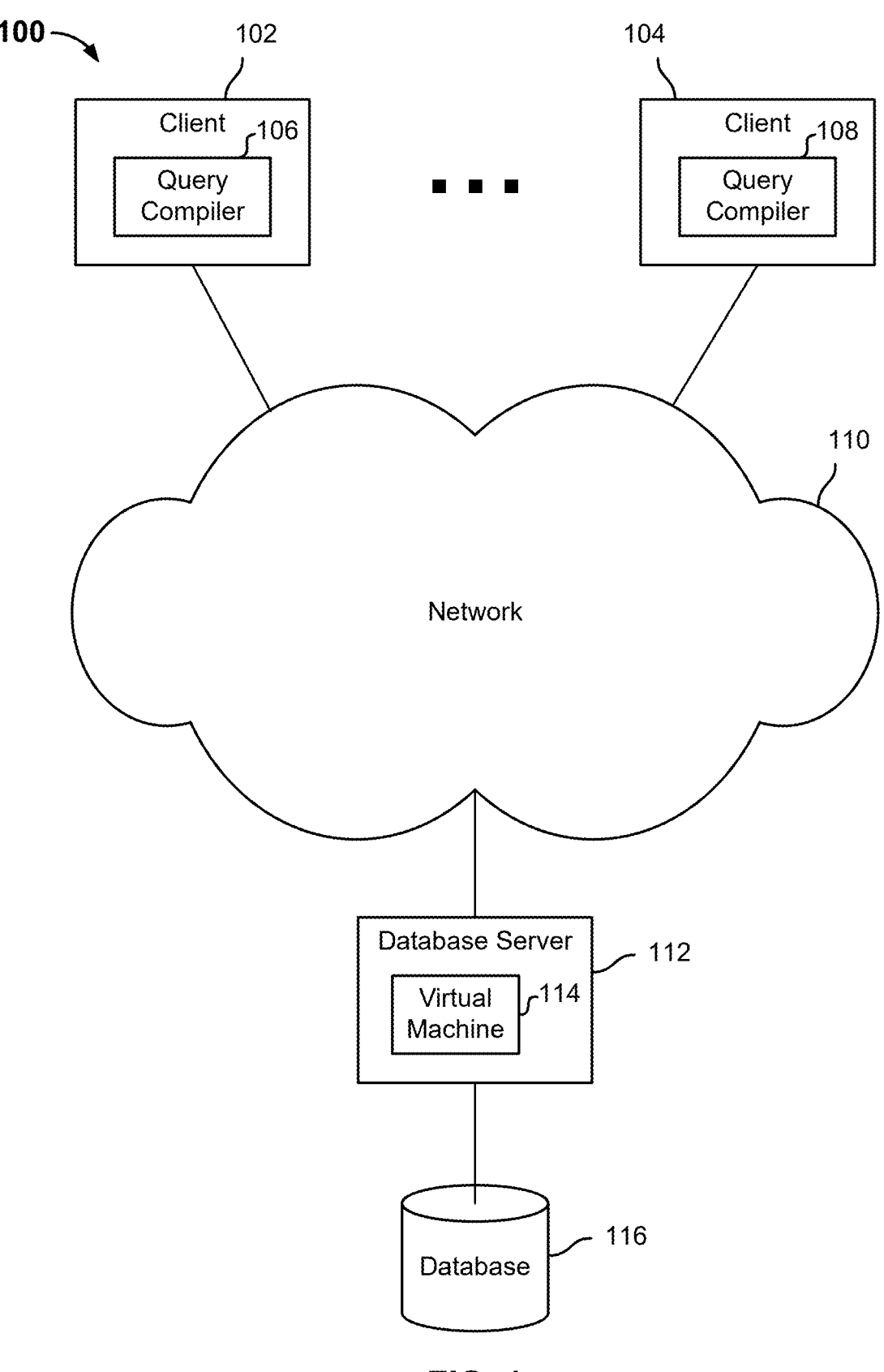
FIG. 1 is a block diagram illustrating an embodiment of a database management system comprising a compiled query-based query engine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to apply advances in programming language capabilities to provide an improved database management system. In various embodiments, a novel query language runtime based on modern programming languages techniques is provided. In various embodiments, approaches disclosed herein match or even outperform traditional query planner/optimizer systems while enabling case of query language evolution and seamless execution on a variety of hardware, e.g., Central Processing Unit (CPU), General-Purpose Graphics Processing Unit (GPGPU), and others.

In various embodiments, techniques from the managed programming languages community are used to create a database runtime system whose components are structured to form a dynamic optimization framework for query execution. A low-latency Just-In-Time (JIT) compilation framework is provided that can: (i) adapt to changes in database schema or the topology of the underlying graph as they occur; and (ii) make efficient use of heterogeneous hardware like GPGPUs. In various embodiments, these advances provide a significant increase in performance with lower system complexity. They also, when coupled with schema-optional databases in various embodiments, lessen the need to perform up-front schema design on performance grounds since the system would not require schemas as an input into a query planner (since there is no query planner).

In various embodiments, a runtime system as disclosed herein is decoupled from the query language. This decoupling is done, in some embodiments, by compiling each query into an executable Intermediate Representation (IR) which is executed by the runtime system, much like how bytecode is executed by the Jave Virtual Machine (JVM). This design enables a runtime system as disclosed herein to execute queries from different query languages simultaneously if they have a valid compiler to generate the required IR. This architectural change helps to lower the cost of implementing and experimenting with query languages: a situation that is prevalent in the graph database community where implementers are trying to keep up with changes to graph query languages, such as openCypher and the ISO standard GQL query language.

FIG. 1 is a block diagram illustrating an embodiment of a database management system comprising a compiled query-based query engine. In the example shown, system 100 includes a plurality of client computers/devices, represented in FIG. 1 by client computers 102, 104. Each of the client computers 102, 104 has a respective query compiler 106, 108 configured to generate a byte code or other intermediate representation of a received query, as disclosed hereon. Each of the client computers 102, 104 is connected via one or more networks 110, e.g., the Internet, a corporate or other enterprise network, etc. to a database server 112. Database server 112 includes one or more virtual machines 114 configured to execute queries received in byte code form from client computers 102, 104 and/or query compilers 106, 108.

In various embodiments, each virtual machine 114 comprises a runtime configured to execute a query based on the byte code representation of the query, as disclosed herein. In various embodiments, the byte code may be interpreted or instead compiled into machine code and executed by hardware comprising the database server 112. Database server 112 may include one or more GPGPUs configured to perform operations comprising a database query, in parallel as/if appropriate, as disclosed herein. In the example shown, each query is performed with respect to one or more databases stored in database store 116, e.g., one or more graphs comprising a graph database.

Figure 2:
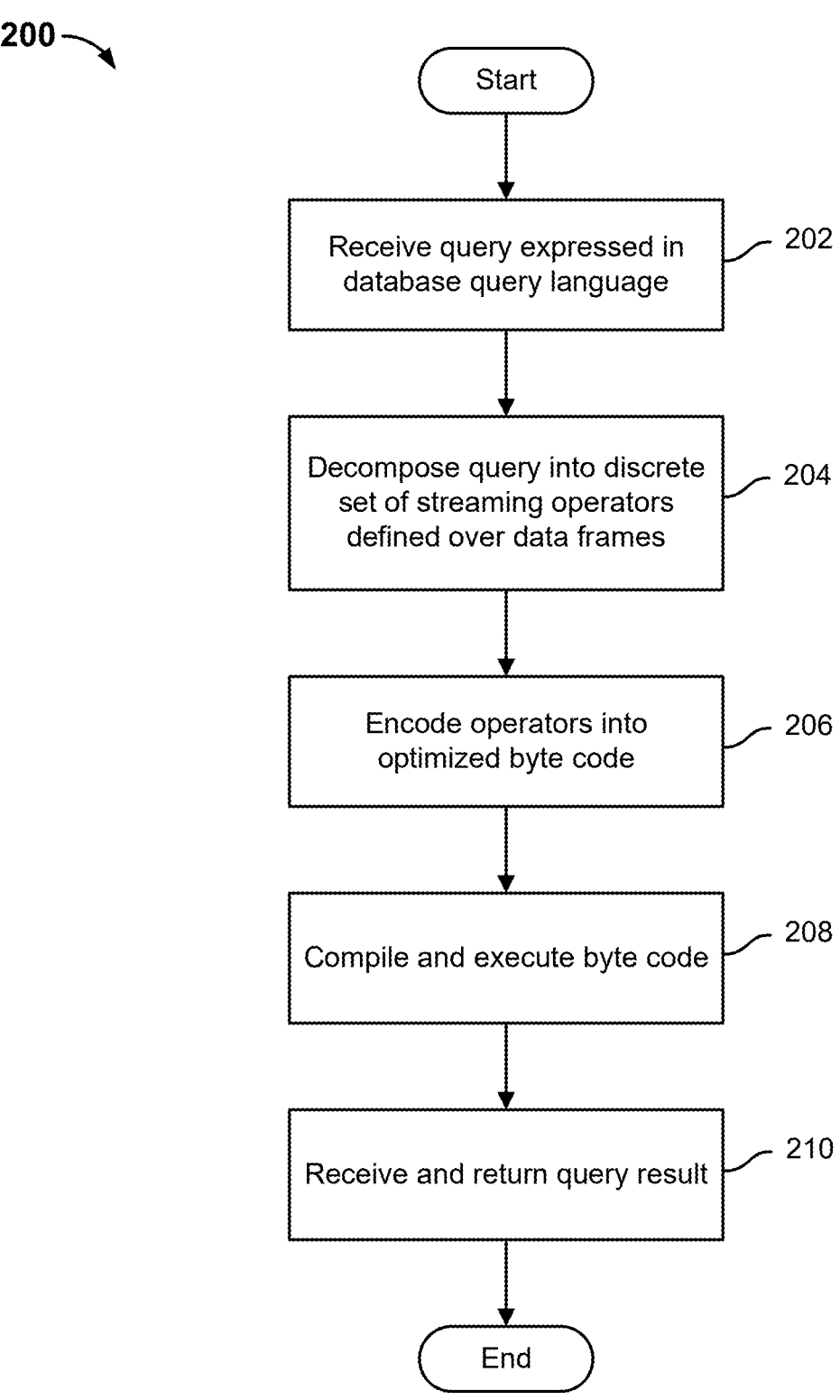
FIG. 2 is a flow diagram illustrating an embodiment of a process to perform a database query.

FIG. 2 is a flow diagram illustrating an embodiment of a process to perform a database query. In various embodiments, the process 200 of FIG. 2 may be performed in part by a query preprocessor and/or compiler, e.g., query compilers 106, 108 of FIG. 1 and in part by a database server, e.g., database server 112 and/or virtual machine 114 of FIG. 1.

In the example shown, at 202 a query expressed in a database query language, e.g., Cypher or GQL, is received. At 204, the query is decomposed into a discrete set of streaming operators define over data frames. At 206, the operators determined in step 204 are encoded into optimized byte code and/or some other intermediate (e.g., runtime interpreted and/or executable) representation. In various embodiments, the encoding generated at 206 includes and/or is supplemented by byte code representing the query and the operators into which the query was decomposed at step 204 as a data flow graph describing the relationship between the operators, in terms of the data flow between them, and the data inputs and output of each, e.g., the data frames each is configured to receive as input and provide as output.

In various embodiments, steps 202, 204, and 206 may be performed at a first computing node, e.g., at a client device such as client computers 102, 104 of FIG. 1.

At 208, the optimized byte code generated at 206 is compiled (or interpreted) and executed, e.g., at a virtual machine or other runtime such as virtual machine 114 of FIG. 1. At 210, a query result is received and returned in response to the query.

FIG. 3 is a block diagram illustrating an example of query processing in a prior art database management system. In the example shown, system 300 processes an example query 302, in this case a simple example to find and count all the nodes having the label "Foo". Query 302 is provided to a database server 304 configured to perform the query with respect to a graph or other data set in database 306. As shown at right, in the typical prior approach, a database server such as server 304 would process a query such as query 302 in a multi-step and/or multi-module process, typically running on a single machine, such as server 304.

Specifically, query 302 typically would be processed first by a parser 310 which generates an abstract syntax tree (AST) representation 312 of the query. AST 312 would then be processed by a query planner, in this example including logical planner 314 and physical planner 316. For example, logical planner 314 may generate a logical plan comprising a collection of logical operators that describe the work required to generate query results and defining which data sources and operators to apply. Physical planner 316 may generate a physical plan which describes the chosen physical execution plan for a query statement. Logical planner 314 and/or physical planner 316 may comprise an optimization module and/or algorithm configured to apply various types of rules to rearrange operators and functions into an optimal plan. The physical planner 316 then converts the optimized logical plan into a physical plan that tells the system how to execute the query, using execution engine 318 in this example.

Figure 4:
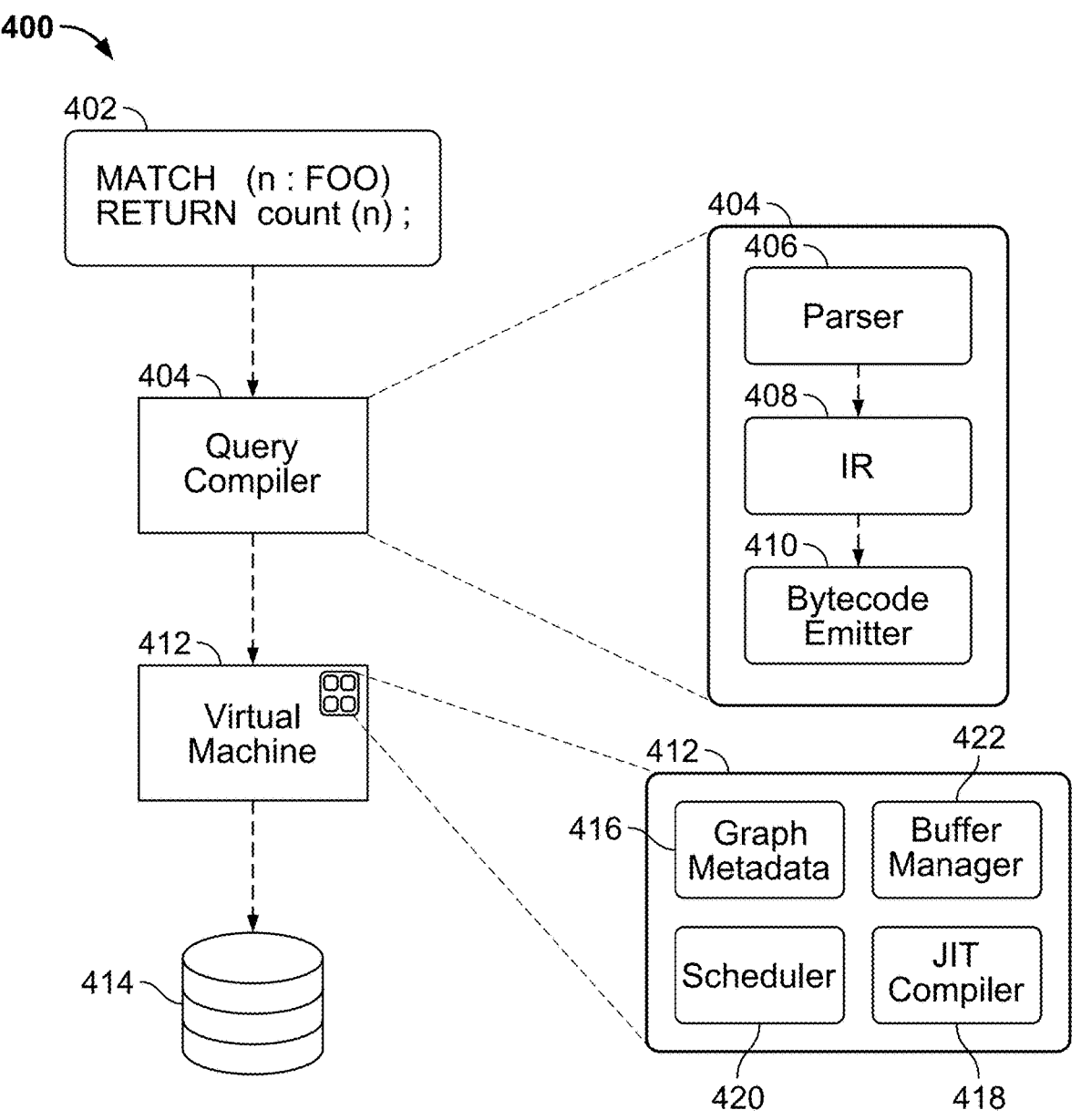
FIG. 4 is a block diagram illustrating an example of query processing in an embodiment of a database management system comprising a compiled query-based query engine.

FIG. 4 is a block diagram illustrating an example of query processing in an embodiment of a database management system comprising a compiled query-based query engine. In the example shown, system 400 is shown processing an illustrative example query 402, in this case the same as query 302 of FIG. 4. The query 402 is processed first by query compiler 404, which generates a byte code (or other intermediate) representation of the query 402. The byte code is sent to virtual machine 412, which compiles (or interprets) and executes the query with which the byte code is associated with respect to a graph or other data set in database 414.

As shown at right, the query compiler 404 includes a parser 406 configured to generate, based on the query 402 as expressed in the query language, as shown in the figure, a byte code or other intermediate representation 408 of the query 402. In various embodiments, the byte code is generated as described in connection with one or more of steps 202, 204, and 206 of FIG. 2. The byte code or other intermediate representation 408 is serialized by byte code emitter 410 and transmitted, e.g., via a network, to the virtual machine 412. (In other embodiments, byte code or other intermediate representation 408 is not serialized and is provided to the virtual machine 412 in another form or format.

Referring further to FIG. 4, in the example shown virtual machine 412 includes the following components/modules: graph metadata 416 comprising metadata describing one or more graphs and/or their content; just-in-time (JIT) compiler 418, configured to optimize and compile byte code for execution; scheduler 420, configured to use code compiled by JIT compiler 418 to create, initialize, schedule and/or queue up work for, and move data frames between instances of operators defined to perform a query; and buffer manager 422 configured to create, allocate, and/or otherwise manage resources such as memory.

In various embodiments, JIT compiler 418 may use data comprising graph metadata 416 and/or the underlying graph to optimize byte code associated with a query.

Figure 5A:
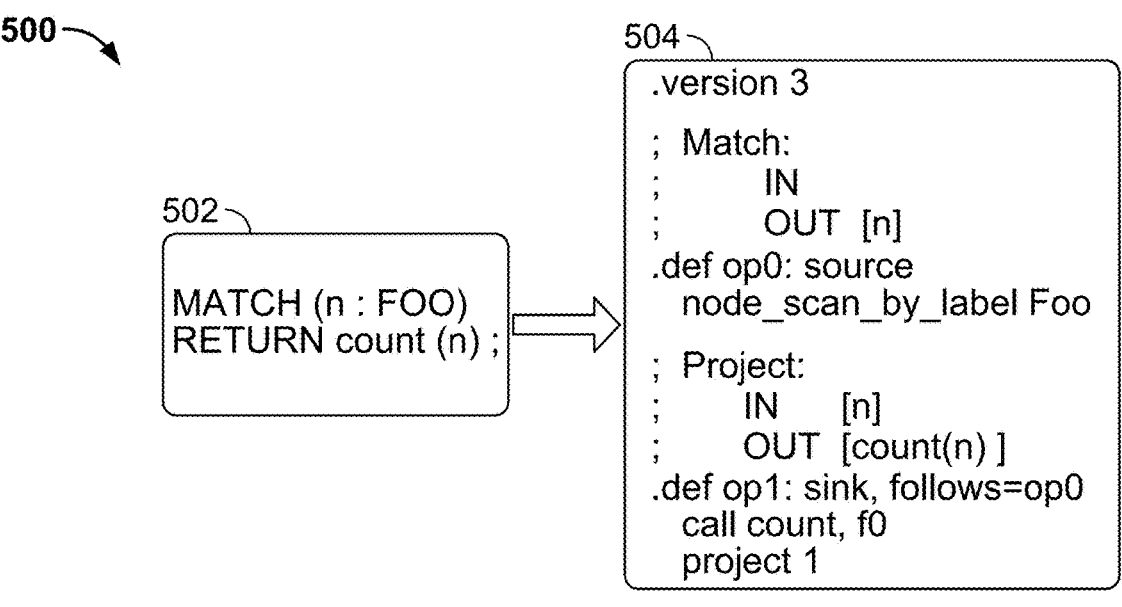
FIG. 5A is a diagram illustrating an example of query decomposition in an embodiment of a database management system.

FIG. 5A is a diagram illustrating an example of query decomposition in an embodiment of a database management system. In the example 500 shown, query 502 (the same as query 302 of FIG. 3 and query 402 of FIG. 4) is decomposed, e.g., by a query compiler as disclosed herein, into decomposed form 504, in which the query 502 is represented as a discrete set of streaming operators defined over data frames. The decomposed form 504 of query 502 represents the query as a data flow, which can be conceptualized and/or represented, in various embodiments, as a graph.

In this example, the query is represented in decomposed form 504 as a first operator ("op0") that scans labels for those that match the argument "Foo" and a second operator ("op1") that receives the outputs generated by the first operator and generates a count. The second operator is designated as the "sink" in this example, which in various embodiments identifies the second operator as the final operator in the data flow graph, such that the output of that operator is the query result. Note the text "follows=op0" specifies the relationship between the operators in the data flow.

Figure 5B:
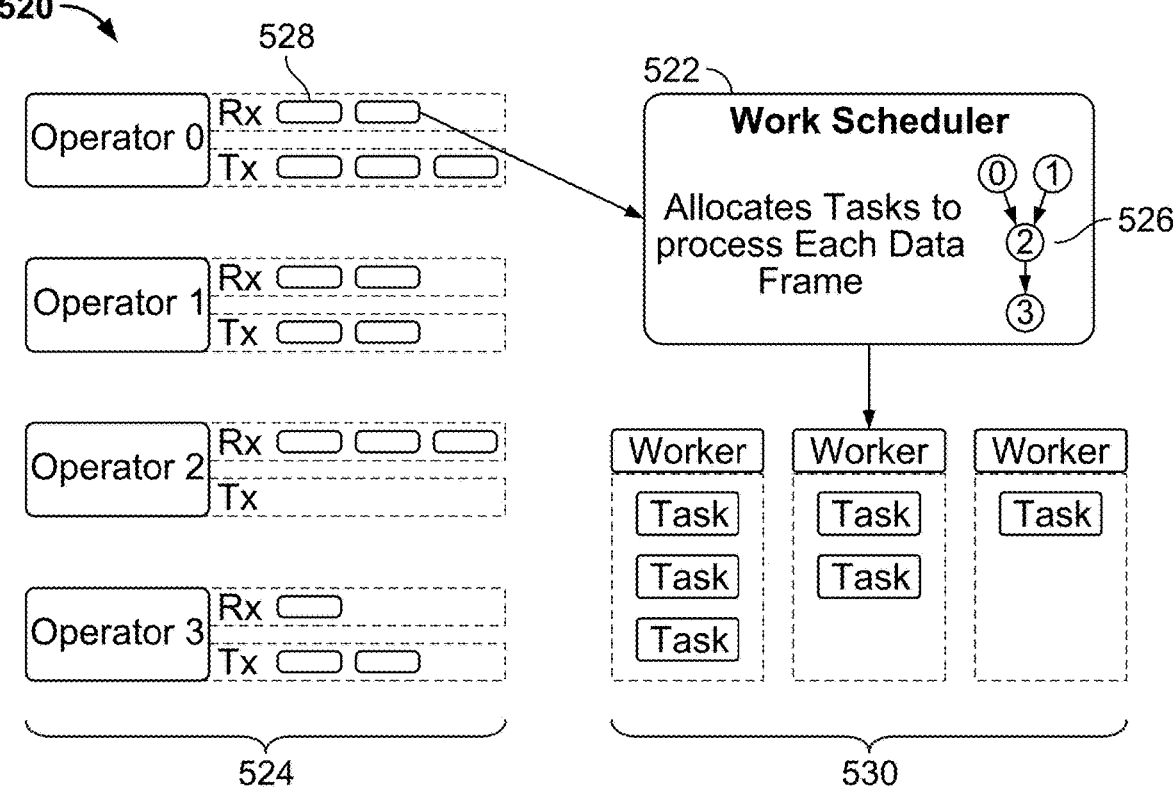
FIG. 5B is a diagram illustrating an example of query execution in an embodiment of a database management system.

FIG. 5B is a diagram illustrating an example of query execution in an embodiment of a database management system. In the example shown, runtime 520 has been configured, by scheduler 522, to run a plurality of operators 524, which implement a data flow represented by graph 526. In various embodiments, each of the operators 524, comprising operators 0, 1, 2, and 3 in this example, is instantiate by executing corresponding code compiled from byte code included in and/or derived (e.g., via optimization processing) from the byte code associated with a query.

In various embodiments, scheduler 522 assigns work to the operators 524 by adding associated data frames, e.g., data frame 528, to their respective input ("Rx") queues. Each operator pulls data frames from their input queue and processes the data frame according to its operator definition/code, using workers 530. For example, each "task" shown in a queue of a worker 530 may comprise the task of executing with respect to a specific data frame code comprising or otherwise associated with an operator that pulled the data frame from its input queue. The result of each such task is placed in the output ("Tx") queue of the associated operator. The work scheduler 522 manages a flow of data frames between operators, e.g., according to the data flow graph 526. For example, in the example shown in FIG. 5B, scheduler 522 may pull data frames from the output queue of Operator 0 or the output queue of Operator 1 and place them in the input queue of Operator 2.

Figure 6:
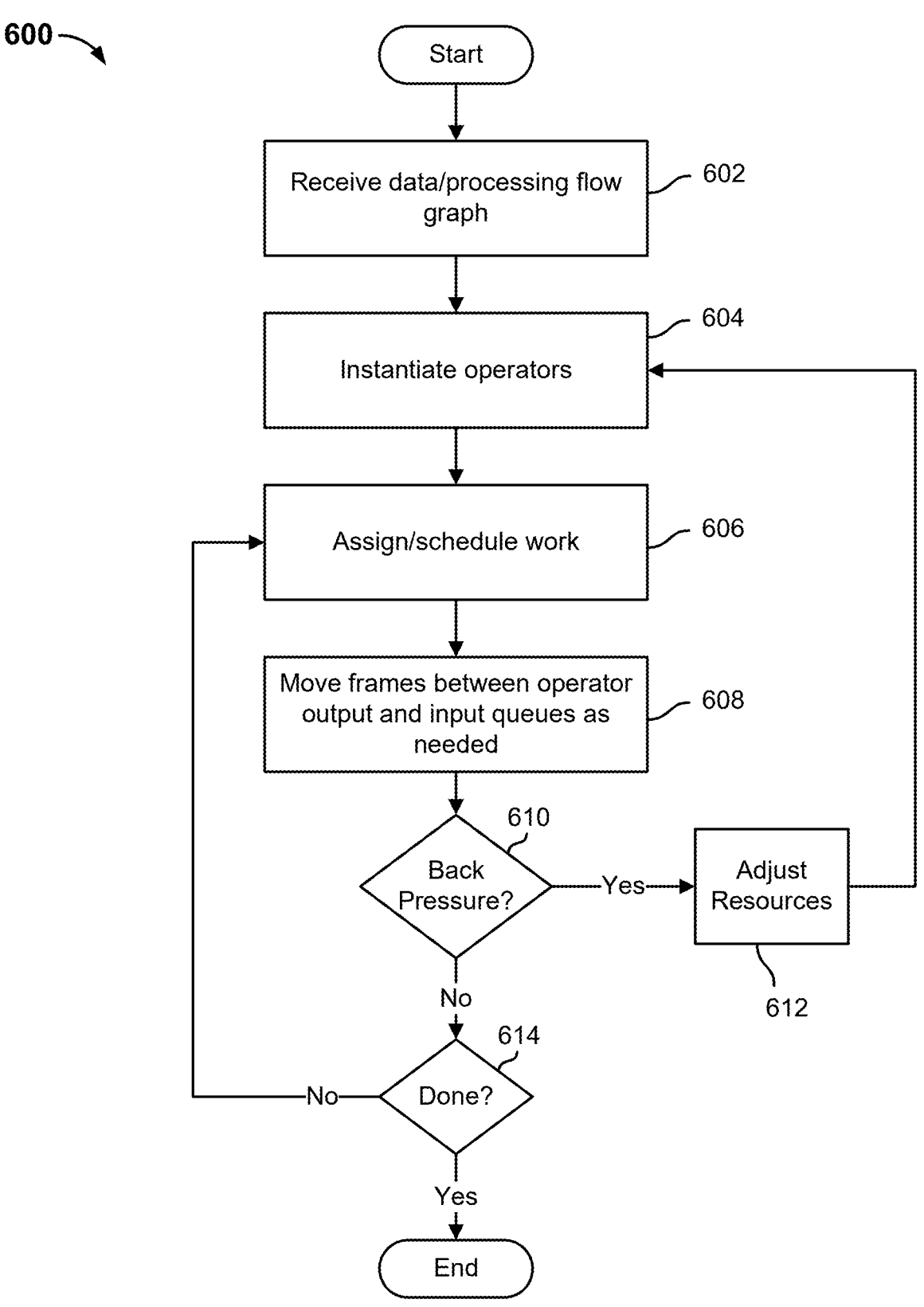
FIG. 6 is a flow diagram illustrating an embodiment of a process to perform dynamically adaptive query execution.

FIG. 6 is a flow diagram illustrating an embodiment of a process to perform dynamically adaptive query execution. In various embodiments, the process 600 of FIG. 6 may be performed by a scheduler or other component comprising and/or executing in or on a runtime, such as scheduler 522 of FIG. 5B. In the example shown, at 602, a data flow graph associated with a query is received, e.g., data flow graph 526 of FIG. 5B. In some embodiments, the graph may be inferred or otherwise determined based on data comprising or otherwise associated with a received byte code representation of a query.

At 604, operators comprising or otherwise associated with the query and/or data flow graph are instantiated. At 606, work is assigned to the respective operators, e.g., by placing in each operator's queue one or more data frames comprising data read or otherwise derived from the graph or other data set to which the query relates and/or a data frame pulled from the output queue of an operator that precedes the operator in the data flow graph. At 608, as processing continues, data frames are moved between the output and input queues of operators that follow one another in the data flow graph. If back pressure is detected, at 610, e.g., an operator's input queue is full or an operator from which a data frame is to be received has an empty output queue, then at 612 resources adjustments may be made. For example, additional instances of an operator may be spun up and run in parallel and/or additional processing, memory, and/or other resources may be allocated to an operator, after which processing resumes/continues 604, 606, 608. Once all data frames have been processed, at 614, the process 600 ends.

Figure 7:
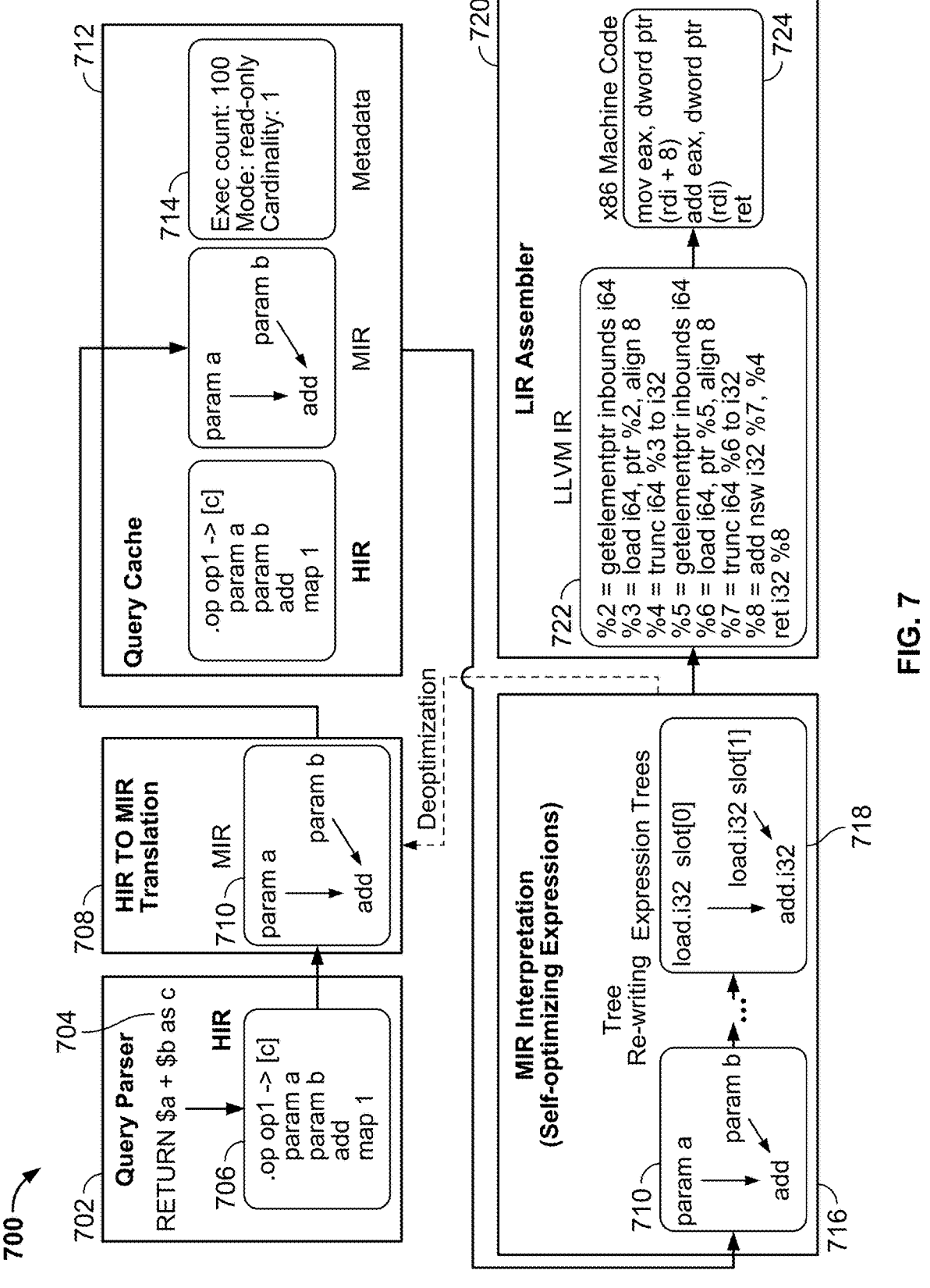
FIG. 7 is a functional flow block diagram illustrating an embodiment of a system configured to perform a query.

FIG. 7 is a functional flow block diagram illustrating an embodiment of a system configured to perform a query. In the example shown, system 700 includes query parser 702 configured to parse queries, such as query 704, to produce a high-level intermediate representation (HIR) 706. A high-level intermediate representation (HIR) to mid-level intermediate representation (MIR) translation module 708 produces a mid-level intermediate representation 710 based on the high-level intermediate representation 706. The mid-level intermediate representation 710 is checked against and/or, if not already presented, stored in a query cache 712, along with a copy of the HIR 706 and associated metadata 714. In various embodiments, the metadata 714 includes a fingerprint, such as a hash or other data that uniquely identifies the MIR 710, to enable the cached MIR 710 to be identified and reused, e.g., to process a subsequent query that is the same as or similar to (e.g., same operations but different target and/or arguments) query 704.

The MIR 710 is processed next by an MIR interpretation module 716. In some embodiments, query parser 702, HIR to MIR translation module 708, and query cache 712 may be present on one machine, e.g., a client computer, while the MIR interpretation module 716 and subsequent components shown in FIG. 7 are present on one or more other machines, such as one or more database servers.

In the example shown, MIR interpretation module 716 performs expression self-optimization processing to generate optimized expression trees 718. In some embodiments, graph data and/or metadata may be used to generate the optimized expression trees 718.

In some embodiments, the MIR interpretation module 716 processes graph data in a data type agnostic manner and/or discovers data types only as/if and/or when needed to generate the expression trees 718. A graph database typically does not have or require a schema that specifies each entity stored in the database and its data type. As a result, the ability of a system as disclosed herein to operate in a data type agnostic manner and/or to discover data types in connection with optimization processing makes the techniques described herein advantageous in processing queries with respect to a graph database.

The expression trees 718 are provided to low-level intermediate representation assembler 720, which generates low-level virtual machine (LLVM), i.e., runtime executable representation 722 of the expression trees 718, which are in turn compiled (or interpreted) to generate and execute associated machine code 724.

Figure 8:
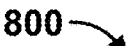
FIG. 8 is a diagram illustrating an example of distributed query execution in an embodiment of a database management system.

FIG. 8 is a diagram illustrating an example of distributed query execution in an embodiment of a database management system. In the example shown, the operators are instantiated on two physically separated machines with "Operator 0" on machine 802 and with "Operator 2" and "Operator 3" on machine 812. Each machine has a copy (full or partial) of the dataflow execution graph in its "L2" scheduler 806 & 816. A proxy operator "Operator 2 proxy" is instantiated on machine 802 that signifies that dataframes arriving in its "Rx" queue on machine 802 should be forwarded to the "Rx" queue on "Operator 2" on machine 812. Dataframes can be forwarded either directly by the proxy operator or indirectly via a scheduling framework. The proxy operator allows the dataflow graph to be partitioned across multiple machines so that operators can act independently whilst also preserving the execution semantics of the query.

A communication channel 818 configured to communicate data frames between the first machine 802 and the second machine 812. In the example shown, data frames are transferred via gRPC, a remote procedure call framework, but other transport mechanisms may be used. Specifically, in the example shown, data frames on the output ("Tx") queue of Operator 0 on the first machine 802 are passed by the L1 scheduler 804 to "Operator 2 Proxy", based on the data flow knowledge held by the higher-level scheduler 806. The Operator 2 Proxy passes the data frames directly or indirectly via a scheduling framework (i.e. the proxy can be hardcoded to transfer only to machine 812 or a scheduling framework can select the best machine from a group of machines based on some desirable criteria such as load) onto communication channel 818 to the second machine 812, where the schedulers 814, 816 place them in the input queue ("Rx") of the "Operator 2". Data frames in the output queue ("Tx") of Operator 2 are placed in the input queue of Operator 3, as described above in the non-distributed example, and in this example Operator 3 is the "sink", so the data frames in the output queue ("Tx") of Operator 3 are used to provide a result to the query, as described above.

In various embodiments, processing may be distributed across many cores and/or physical machines, including across networks, to scale the computing capacity as needed to maximize performance, including through parallel processing, such as may be determined to be permitted and/or required based on the graph representation of the data flow determined for the query.

In various embodiments, resources may be added or removed dynamically, e.g., to achieve performance goals or requirements and/or as early nodes (operators) in the data flow complete their work and/or later nodes (operators) are ready to begin their work.

In various embodiments, techniques disclosed herein enable memory use to be maintained at a relatively low and consistent level, e.g., by managing the number of operator instances and the size of their respective input and output queues. Data is read from the graph selectively and as needed to provide data frames to the input queues of operators that operate on data read directly from the graph, rather than reading an entire graph or large portion thereof into memory prior to processing the query and/or without the requirement or practice of keeping such portions of the graph in memory longer than may be needed to perform required processing.

Figure 9:
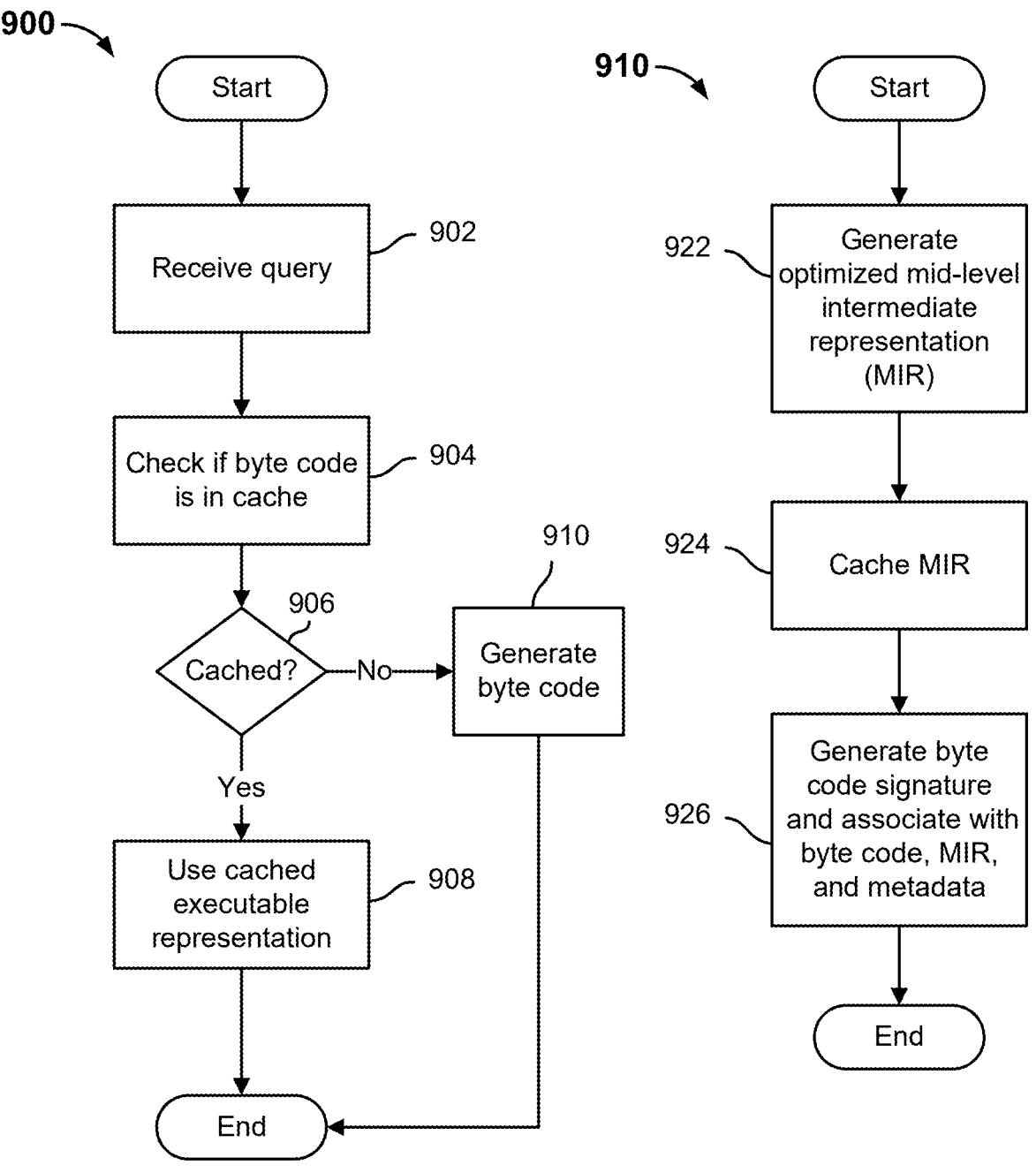
FIG. 9A is a flow diagram illustrating an embodiment of a process to retrieve or generate an intermediate representation of a query.
FIG. 9B is a flow diagram illustrating an embodiment of a process to generate an intermediate representation of a query.

FIG. 9A is a flow diagram illustrating an embodiment of a process to retrieve or generate an intermediate representation of a query. In various embodiments, the process 900 of FIG. 9A is implemented by a query compiler, such as query compilers 106, 108 of FIG. 1.

In the example shown, at 902, a query is received. At 904, a check is performed to determine whether byte code (or another intermediate representation) has already been generated and cached for the query. If byte code for the query is found to be in the cache (906), a cached executable representation is used. This could be a pre-optimized interpretable expression tree or pre-compiled machine code; otherwise, an executable representation of the query is generated i.e. interpretable expression trees (or MIR) is generated for the query (910), e.g., as described above.

FIG. 9B is a flow diagram illustrating an embodiment of a process to generate an intermediate representation of a query. In various embodiments, the process of FIG. 9B is performed to generate an executable intermediate representation of the bytecode (that transitively represents a query) for a query for which bytecode has not previously been seen in the system, e.g., as in step 910 of the process 900 of FIG. 9A. In the example shown, at 922 an executable intermediate representation of the query is generated from the bytecode. At 924, this executable representation alongside the bytecode is added to a cache, e.g., query cache 712 of FIG. 7. At 926, a signature is generated from the bytecode for the query that uniquely identifies the query and can be used to recover both the cached bytecode and intermediate representation to facilitate the future execution or optimization of the query.

In some embodiments, a global or central cache may be maintained by a server, e.g., server 112 of FIG. 1, to enable a query submitted by a first client/user, e.g., client 102 of FIG. 1, to be used to speed processing of a query submitted at/by a second client/user, e.g., client 104 of FIG. 1. For example, upon receipt of a query, an associated signature may be generated and used to check a local cache. If present locally, a corresponding locally cached intermediate representation associated with the query may be used. If not present locally, a central/global cache may be checked. If present, an intermediate representation stored in the central/global cache may be used to perform the query.

Figure 10:
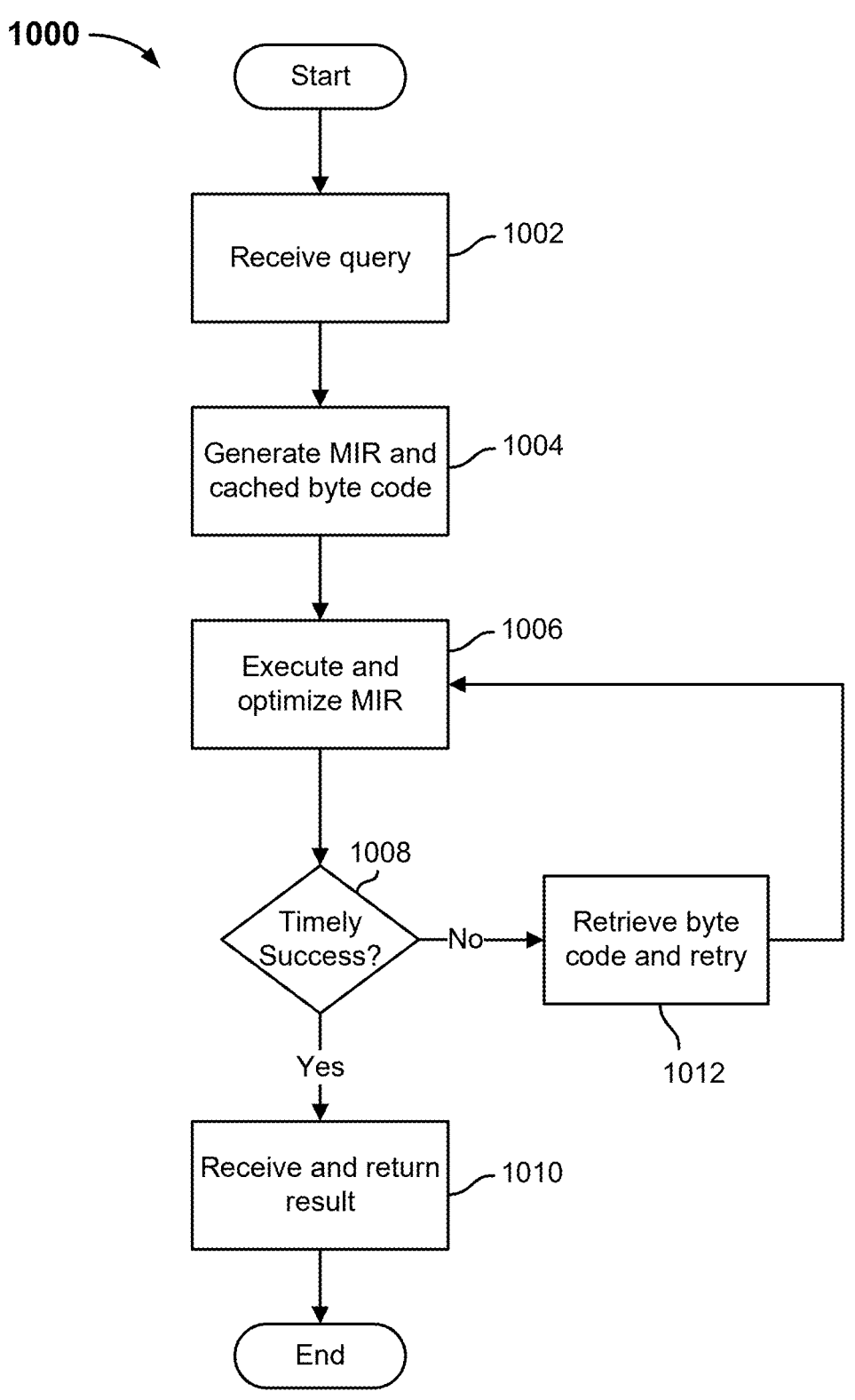
FIG. 10 is a flow diagram illustrating an embodiment of a process to iteratively revert to, compile, and execute a bytecode representation of a query.

FIG. 10 is a flow diagram illustrating an embodiment of a process to iteratively revert to, compile, and execute a bytecode representation of a query. In various embodiments, the generation of bytecode (or another intermediate representation) of a query, as disclosed herein, provides a reliable intermediate state to which processing may revert, as/if needed, e.g., to recover from a downstream error, such as receiving an unexpected data type or null value or if a previously applied optimization is no longer valid or worthwhile.

In the example shown in FIG. 10, at 1002, a query is received. At 1004, bytecode (or other intermediate representation) is generated for the query and cached. At 1006, the bytecode is simultaneously optimized and executed, e.g., it is compiled/interpreted and executed by a virtual machine or other runtime, as described above. If the bytecode was executed successfully (1008), then at 1010 a query result is received and returned. If the bytecode was not executed successfully or a performance slowdown is detected (1008), then at 1012 the bytecode generated for the query is retrieved (if not already at hand) and a further attempt to execute and optimize the bytecode is performed at 1006. In various embodiments, execution may be attempted up to a prescribed number of tries, after which an error is generated and/or other exception handling occurs.

In various embodiments, techniques disclosed herein may be used to quickly and efficiently generate search results in response to a query. In various embodiments, techniques disclosed herein may be applied in contexts other than creating better graph database management systems. For example, and without limitation, in various embodiments techniques disclosed herein may be applied to provide better relational database management systems and/or systems other than database systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

receive at a client device a query associated with a database, wherein the query is expressed in one of a plurality of supported query languages;

generate a byte code representation of the query, including by decomposing the query into a discrete set of streaming operators defined over associated data frames, wherein the byte code includes code defining for each operator in the discrete set of streaming operators the processing to be performed by that operator and further embodies a data flow graph that defines a flow of data to and through the discrete set of streaming operators;

serialize the byte code and sending the serialized byte code to a remote database server;

receive from the remote server a response to the query; and return the response; and a memory coupled to the processor and configured to store the byte code representation of the query;

wherein the remote server is configured to execute the byte code to instantiate one or more instances of operator in the discrete set of streaming operators and use the data flow graph to manage the flow of data to and through the respective streaming operators and use data frames in an output queue of a final operator in the data flow graph to provide the result to the query.

2. The system of claim 1, wherein the processor is further configured to optimize the byte code representation of the query.

3. The system of claim 2, wherein the byte code is optimized based at least in part using metadata associated with the database.

4. The system of claim 2, wherein the byte code is optimized based at least in part using data read from the database.

5. The system of claim 1, further comprising a communications interface coupled to the processor and wherein the processor is further configured to send the byte code representation of the query to the database server with which the database is associated.

6. The system of claim 5, wherein the database server is configured to optimize or further optimize the byte code representation of the query.

7. The system of claim 5, wherein the database server comprises a virtual machine or other runtime configured to execute the byte code representation of the query.

8. The system of claim 7, wherein the virtual machine or other runtime is configured to compile the byte code representation of the query to generate executable machine code.

9. The system of claim 7, wherein execution of the byte code representation of the query causes the database server to create an instance of each of a plurality of operators comprising the discrete set of streaming operators and provide a scheduler configured to cause data frames to be provided to the respective input queues of each of the plurality of operators.

10. The system of claim 9, wherein the scheduler is configured to cause a data frame to be moved from the output queue of a first operator to the input queue of a second operator based at least in part on the data flow graph that defines the flow of data to and through the discrete set of streaming operators.

11. The system of claim 7, wherein the database server comprises a plurality of processing cores and the database server is configured to execute portions of the byte code representation of the query in parallel, across multiple of said cores, as permitted or required by the data flow graph that defines the flow of data to and through the discrete set of streaming operators.

12. The system of claim 7, wherein the database server comprises a distributed system comprising a plurality of physical machines and the database server is configured to execute portions of the byte code representation of the query across multiple of the physical machines.

13. The system of claim 12, wherein the database server implements a first subset of the discrete set of streaming operators at a first machine and a second subset of the discrete set of streaming operators at a second machine.

14. The system of claim 13, wherein the database server provides at the first machine a first operator proxy configured to send data frames via a communications channel to the second machine, and wherein the second machine is configured to place said data frames in an input queue of an instance of an associated operator running on the second machine.

15. The system of claim 7, wherein the database server is configured to distribute work among the plurality of machines according to a load balancing algorithm.

16. The system of claim 7, wherein the database server is configured to allocate work among the plurality of machines in response to back pressure.

17. The system of claim 1, wherein the processor is further configured to cache the byte code representation of the query.

18. The system of claim 17, wherein the query comprises a first query and wherein the processor is further configured to receive a second query, determine the second query is the same as the first query, and retrieve and use the previously cached byte code representation of the first query to process the second query.

19. A method, comprising:

receiving at a client device a query associated with a database, wherein the query is expressed in one of a plurality of supported query languages;

generating a byte code representation of the query, including by decomposing the query into a discrete set of streaming operators defined over associated data frames, wherein the byte code includes code defining for each operator in the discrete set of streaming operators the processing to be performed by that operator and further embodies a data flow graph that defines a flow of data to and through the discrete set of streaming operators;

storing the byte code representation of the query;

serializing the byte code and sending the serialized byte code to a remote database server;

receiving from the remote server a response to the query; and returning the response;

wherein the remote server is configured to execute the byte code to instantiate one or more instances of operator in the discrete set of streaming operators and use the data flow graph to manage the flow of data to and through the respective streaming operators and use data frames in an output queue of a final operator in the data flow graph to provide the result to the query.

20. A computer program product embodied in a non-transitory computer readable medium and comprising computer instructions for:

receiving at a client device a query associated with a database, wherein the query is expressed in one of a plurality of supported query languages;

generating a byte code representation of the query, including by decomposing the query into a discrete set of streaming operators defined over associated data frames, wherein the byte code includes code defining for each operator in the discrete set of streaming operators the processing to be performed by that operator and further embodies a data flow graph that defines a flow of data to and through the discrete set of streaming operators;

storing the byte code representation of the query serializing the byte code and sending the serialized byte code to a remote database server;

receiving from the remote server a response to the query; and returning the response;

wherein the remote server is configured to execute the byte code to instantiate one or more instances of operator in the discrete set of streaming operators and use the data flow graph to manage the flow of data to and through the respective streaming operators and use data frames in an output queue of a final operator in the data flow graph to provide the result to the query.

* * * * *